(12) United States Patent
Verma et al.

(10) Patent No.: US 10,574,777 B2
(45) Date of Patent: Feb. 25, 2020

(54) EDGE CACHING FOR COGNITIVE APPLICATIONS

(71) Applicant: International Business Machines Corporation, Armonk, NY (US)

(72) Inventors: Dinesh Verma, New Castle, NY (US); Mudhakar Srivatsa, White Plains, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 161 days.

(21) Appl. No.: 15/615,237

(22) Filed: Jun. 6, 2017

(65) Prior Publication Data

US 2018/0352045 A1    Dec. 6, 2018

(51) Int. Cl.
*H04L 29/08* (2006.01)
*G06N 5/02* (2006.01)

(52) U.S. Cl.
CPC ......... *H04L 67/2842* (2013.01); *G06N 5/022* (2013.01); *H04L 67/02* (2013.01)

(58) Field of Classification Search
None
See application file for complete search history.

(56) References Cited

U.S. PATENT DOCUMENTS

| 8,332,345 | B1 | 12/2012 | Murphy et al. |
| 9,507,842 | B2 | 11/2016 | Knoll et al. |
| 2007/0080288 | A1* | 4/2007 | Lim ........................ G01J 1/02 250/227.21 |
| 2014/0215173 | A1 | 7/2014 | Clark |
| 2016/0085682 | A1 | 3/2016 | Johnson et al. |
| 2016/0299975 | A1 | 10/2016 | Acar et al. |

(Continued)

FOREIGN PATENT DOCUMENTS

| CN | 1585941 A | 5/2010 |
| CN | 102081625 A | 6/2011 |
| CN | 102819420 B | 5/2015 |

(Continued)

OTHER PUBLICATIONS

Zheng, B., Lee, W. C., & Lee, D. L. (2004). On semantic caching and query scheduling for mobile nearest-neighbor search. Wireless Networks, 10(6), 653-664.

(Continued)

*Primary Examiner* — Philip J Chea
*Assistant Examiner* — Hassan A Khan
(74) *Attorney, Agent, or Firm* — Garg Law Firm, PLLC; Rakesh Garg; Joseph Petrokaitis

(57) ABSTRACT

For caching of cognitive applications in a communication network a first input signal from a sensor device is detected by a proxy having a cache associated therewith. A representation of the first input signal is computed and sent to a server. A handle function is applied to the representation of the first input signal to compute a first handle value corresponding to the first input signal. The representation of the first input signal is transformed using a cognitive processing model of an answer function to compute a first answer value. A content of the cache is modified by the proxy by storing the first answer value in association with the first handle value in the cache.

18 Claims, 6 Drawing Sheets

(56) References Cited

U.S. PATENT DOCUMENTS

2018/0219920 A1* 8/2018 Patel .................. H04L 63/102
2018/0284735 A1* 10/2018 Cella .................. G05B 23/024

FOREIGN PATENT DOCUMENTS

CN 105931633 A 9/2016
WO 2016025827 A1 2/2016

OTHER PUBLICATIONS

Disclosed anonymously. (2009). Method and System for Achieving Fast Response Time Using Data Semantic Relationships for Information Services that Federate Large Number of Data.
PCT, International Seaching Authority, PCT/IB2018/053934, dated Sep. 26, 2018.

* cited by examiner

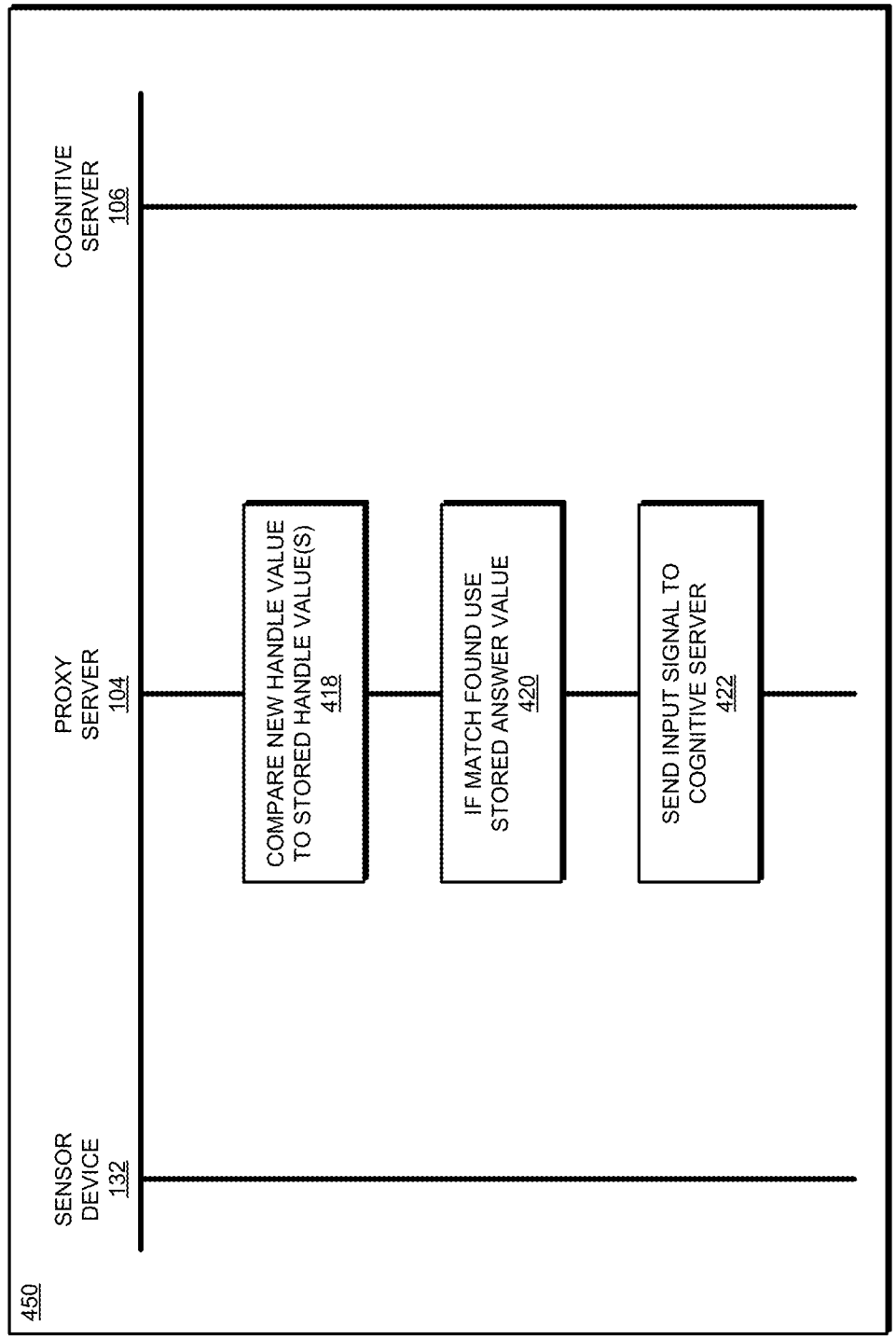

EDGE CACHING FOR COGNITIVE APPLICATIONS

TECHNICAL FIELD

The present invention relates generally to a method, system, and computer program product for caching within a communication network. More particularly, the present invention relates to a method, system, and computer program product for edge caching for cognitive applications in a communication network.

BACKGROUND

In environments where network bandwidth is limited, a network cache can be used to improve the effective response time between a client and a server. A network cache is data storage that is located closer to the requester than a server that originally contains the requested data. Caching has been used effectively for applications such as web-applications, databases and computer processing. Web caching utilizes temporary storage for storing web documents, such as HTML pages and images, to reduce bandwidth usage, server load, and/or perceived lag.

Although web-caching is used frequently, caching has also been used extensively in other distributed systems, such as information centric networks. Caching performs well in these environments because a request often includes a unique handle such as a Uniform Resource Identifier (URI). The handle can be used as a unique name that is associated with cached data. Caching works by implementing a proxy or gateway which allows requests from a client to pass through to a server. When the proxy receives a request containing a handle that has not been previously encountered, the proxy sends the requests to the server, sees the resulting response and stores the result locally. When a second request with the same handle is encountered by the proxy in the future, the locally stored data is sent by the proxy in a response to the client instead of sending the request to the server to get a response from the server. Various caching implementations are concerned with how to manage the locally cached data, as well as maintaining consistency between cache and server data.

Cognitive applications are applications which take a request from a client (which can include a signal from a sensor device, voice samples from a microphone, a request from a computer software, or a signal from other types of devices) and apply machine learning techniques to produce an output. In particular implementations, the output is the result of feeding the signal received from the sensor device as an input to a cognitive engine (e.g., a neural network, a decision tree, a rule engine etc.). Examples of input signals include a machine audio signal, a video signal, or other sensor output signals. A typical machine learning application is a classification system in which an input signal, such as a measured audio signal, is classified by machine learning techniques into different categories, e.g. a normal sound, breaking glass, broken gear, etc.

In a typical system for a cognitive application a sensor generates a signal and sends the signal to a server over a network. When the server receives the signal as an input signal, the server compares the input signal against a model stored locally by the model. In some applications, the model may have been previously learned using training data and may take the form of a neural network, a decision table or a rule set, or other modeling implementations. In a typical implementation, the server compares input signal x against the model, and computes a function f(x). The server then uses the result of the computation of f(x) for a subsequent action such as sending a notification, opening a trouble ticket etc. In some other cases, the server may be using many cognitive applications in a sequence.

However, in some situations, the network between the sensor and the server has a high degree of latency or limited bandwidth. In other case, privacy or regulations may prevent input from being sent over the network. The illustrative embodiments recognize that in these and many other cases, approaches to avoid utilizing the network to access a distant data source by using a more local data source, e.g. by using a proxy server, are desirable. In addition, it may be desirable to configure the proxy to perform other processing on the input signal. However, in many cases the proxy may not be able to use the network model. The network model may be too big, or may require some additional data at the server.

The illustrative embodiments recognize that in the case of many cognitive applications that are based on machine learning techniques, straight-forward caching is ineffective. The input signals may contain a lot of noise, and two consecutive requests do not exactly correspond to the same input. The signal does not contain a unique handle, and even the same signal (e.g. the sound of an engine or the image of a device) may be slightly different over different readings. As a result, the illustrative embodiments recognize that the input in its raw format would rarely match, and caching does not work effectively. As a result, it is hard to create effective caches for cognitive applications.

Various embodiments described herein provide for an improvement in the effectiveness of caching for cognitive applications by configuring a proxy server to use a handle function to generate a handle for a received signal to assist in caching the input signals in a cache associated with the proxy server.

SUMMARY

The illustrative embodiments provide a method, system, and computer program product for caching of cognitive applications in a communication network. An embodiment of a method includes detecting, by a proxy having a cache associated therewith, a first input signal from a sensor device. The embodiment includes computing a representation of the first input signal, the representation being sent to a server. The embodiment includes applying a handle function to the representation of the first input signal to compute a first handle value corresponding to the first input signal. The embodiment further includes transforming the representation of the first input signal using a cognitive processing model of an answer function to compute a first answer value. The embodiment includes modifying, by the proxy, a content of the cache by storing the first answer value in association with the first handle value in the cache. An advantage of the embodiment is that the embodiment provides for an improvement in the effectiveness of caching for cognitive applications through the use of a proxy to generate a handle for received input signals to assist in caching the input signals.

Another embodiment further includes detecting, by the proxy, a second input signal. The embodiment includes computing, by the proxy, a candidate handle value using the handle function upon the second input signal. The embodiment includes comparing the candidate handle value to the first handle value stored in the cache. The embodiment further includes determining whether the candidate handle value matches the first handle value. An advantage of the embodiment is that the embodiment enables the proxy to determine whether a candidate handle value matches a stored handle value in the cache without communicating with the server, thereby conserving bandwidth and computing resources within the network.

Another embodiment further includes using, by the proxy, the first answer value for the second input signal responsive to determining that the candidate handle value matches the first handle value. An advantage of the embodiment is that the embodiment enables the proxy to use an answer value stored in the cache rather than retrieving the answer value from the server, thereby conserving bandwidth and computing resources within the network.

Another embodiment further includes sending a representation of the second input signal to the cognitive server responsive to determining that the candidate handle value does not match the first handle value. An advantage of the embodiment is that the embodiment enables the proxy to send a representation of the input signal rather than the input signal itself to the server, thereby conserving bandwidth and computing resources within the network.

Another embodiment further includes receiving a second handle value for the second input signal, in which the second handle value is computed by applying the handle function to the representation of the second input signal. The embodiment further includes receiving a second answer value corresponding to the representation of the second input signal, in which the second answer value is determined by transforming the representation of the second input signal using the cognitive processing model of the answer function to compute the first value. The method further includes modifying, by the proxy, the contents of the cache by storing, the second answer value in association with the second handle value in the cache. An advantage of the embodiment is that the embodiment enables the proxy to update the cache associated with the proxy with updated values to improve the hit rate of the cache.

In another embodiment determining whether the candidate handle value matches the first handle value includes performing a nearest neighbor search between the candidate handle value and the first handle value. An advantage of the embodiment is that the embodiment allows for using a nearest neighbor search to improve the efficiency of the cache search by the proxy.

In another embodiment, the first input signal is representative of a measurement by the sensor device within an environment of the sensor device. An advantage of the embodiment is that the embodiment provides for processing of input signals located in a particular environment to identify particular input signals measured in the environment.

In another embodiment, the handle function is configured to produce the handle value as a lower dimensional representation of the input signal than a dimension of the original input signal. An advantage of the embodiment is that the embodiment provides for conserving computing resources within the network due to the lower dimensional representation requiring fewer computing resources to process.

In another embodiment, the representation of the first input signal includes the first handle value determined at the proxy. An advantage of the embodiment is that the embodiment allows for determining of the handle value at the proxy, rather than requiring the input signal to be sent to the server for determining the handle value, thereby conserving bandwidth within the network.

Another embodiment further includes receiving, by the proxy, an indication of the handle function from the server. An advantage of the embodiment is that the embodiment provides for determining the handle function at the server rather than at the proxy, thereby requiring less computing resources by the proxy.

Another embodiment further includes sending a domain name associated with a domain of the sensor device to the server in which the server determines the handle function from a plurality of handle functions based upon the domain name. An advantage of the embodiment is that the embodiment provides for the server to determine the handle function that best suits the input signals expected at a particular domain, thereby improving the accuracy and efficiency of identifying signals within the domain.

Another embodiment further includes determining a reconstruction error on the first input signals using the handle function. The embodiment further includes comparing a distribution of the reconstruction error of the first input signal to a distribution of reconstructions errors in training data associated with the cognitive model. The embodiment further includes triggering a cache invalidation operation upon the cache responsive to determining that the comparison of the distribution of reconstruction errors exceeds a predetermined threshold value. An advantage of the embodiment is that the embodiment provides for invalidation of the cache associated with the proxy to ensure that the cache remains updated with the most recent answer values, thereby improving the hit rate of the cache.

Another embodiment includes a computer program product for caching of cognitive applications in a communication network. An advantage of the embodiment is that the embodiment provides for an improvement in the effectiveness of caching for cognitive applications through the use of a proxy to generate a handle for received input signals to assist in caching the input signals.

Another embodiment includes a computer system for caching of cognitive applications in a communication network. An advantage of the embodiment is that the embodiment provides for an improvement in the effectiveness of caching for cognitive applications through the use of a proxy to generate a handle for received input signals to assist in caching the input signals.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIGS. 4A-4B depict an example messaging flow between a proxy server and a cognitive server according to an illustrative embodiment.

DETAILED DESCRIPTION

Figure 1:
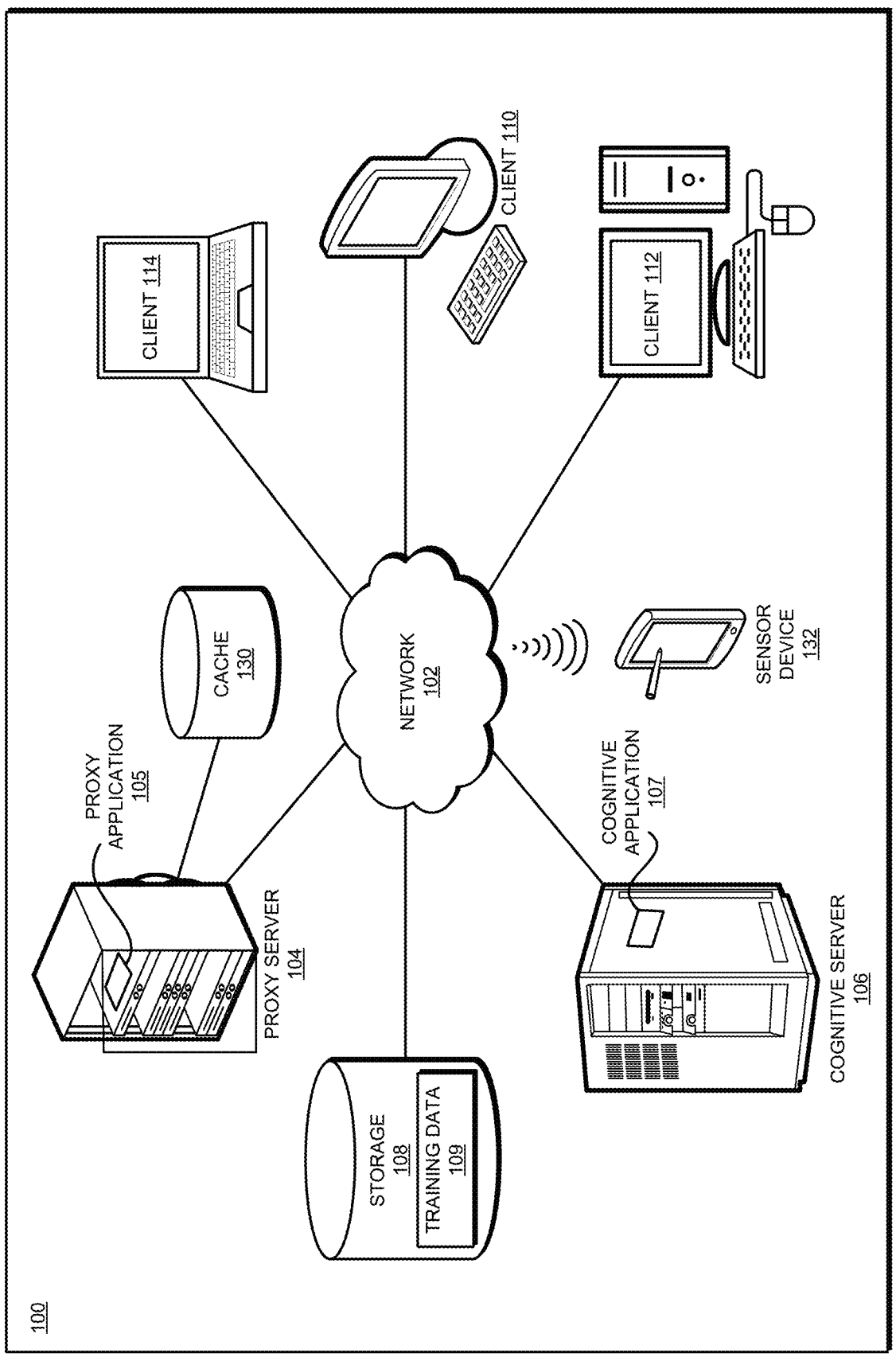
FIG. 1 depicts a block diagram of a network of data processing systems in which illustrative embodiments may be implemented.

The illustrative embodiments described herein generally relate to edge caching for cognitive applications. As previously discussed, cognitive applications are computer processing applications which take a signal from a sensor device and apply machine learning techniques to a set of training data to produce an output. In accordance with one or more embodiments, a caching protocol is implemented between a proxy server having an associated local cache and a cognitive server, in which the cognitive server returns not only the result of applying an input signal on a cognitive model, but also implements a handle generation function or encoding function configured to generate a unique handle for an input signal. In one or more embodiments, the handle generator function or encoding function is computed on each input signal received from a sensor device to create a unique handle for the input signal, and the proxy server stores the result received from the cognitive server in association with the handle in the cache.

In the embodiment, when the proxy server receives a new input signal from a sensor device, the proxy server computes a new handle for the new input signal using the same handle function used to compute the handle for the initial input signal, and determines whether the new handle matches the handle stored in the cache using predetermined matching criteria. If a match is found, the proxy server using the result associated with handle as the result for the new input signal. In one or more embodiments, the hit rate of the cache is improved through use of the unique handle. If a match is not found, the proxy server forwards the new input signal to the cognitive server, and the cognitive server computes a result and a handle for the new input signal. The cognitive server sends the new result and new handle to the proxy server. The proxy server then stores the new handle and new result or answer value within the cache associated with the proxy server. In accordance with one or more embodiments, a state of the cache is changed because the storing of the answer value modifies whatever is residing the cache prior to the storing. When a new input signal is received by the proxy server having a computed handle value matching a handle value stored in the cache, the proxy server can use the answer value associated with the matching handle value rather than requiring the cognitive server to determine the answer value for the new input signal.

Accordingly, one or more embodiments described herein provide for an improvement in the effectiveness of caching for cognitive applications through the use of a proxy server to generate a handle for received input signals to assist in caching the input signals.

In one or more embodiments, the handle function used to generate a handle value for a particular input signal received from a sensor device is chosen according to one or more properties of the input signal. In a particular embodiment, the handle function is used to produce a lower dimensional representation of the input signal than a dimension of the original input signal, and the answer values are indexed by the lower dimensional representation within the cache of the proxy server. In the particular embodiment, the proxy server performs a nearest neighbor search on the indexed values to determine whether there is a cache hit or cache miss. Upon a cache hit, the proxy server uses the answer value corresponding to the matched handle value. Upon a cache miss, the proxy server sends either the raw input signal or its lower dimensional representation to the cognitive server.

In another particular embodiment, the proxy server uses the handle function to trigger cache invalidation. Cache invalidation refers to a process in which entries in the cache are replaced or removed because they are no longer valid. In the particular embodiment, the proxy server uses the handle function to determine a reconstruction error on one or more input signals. The proxy server then compares the distribution of the reconstruction errors of the input signals to a distribution of reconstructions errors in training data. In a particular embodiment, the proxy server uses a Kullback-Leibler (KL) divergence measure to determine how the probability distribution of the reconstruction errors of the input signals differs from the probability distribution of the reconstruction errors of training data. If the distribution of reconstruction errors exceeds a predetermined threshold value, the proxy server triggers a cache invalidation operation upon the cache.

In another particular embodiment, the proxy server is configured to perform cache revalidation using the handle function. In such an embodiment, the proxy server retrains the model function and handle function at the cache. In another particular embodiment, the proxy server may periodically merge retrained model functions and handle functions from multiple caches (e.g., at a centralized cloud).

The illustrative embodiments are described with respect to certain types of input signals, handle functions, cognitive processing algorithms, cognitive processing models, neural networks, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
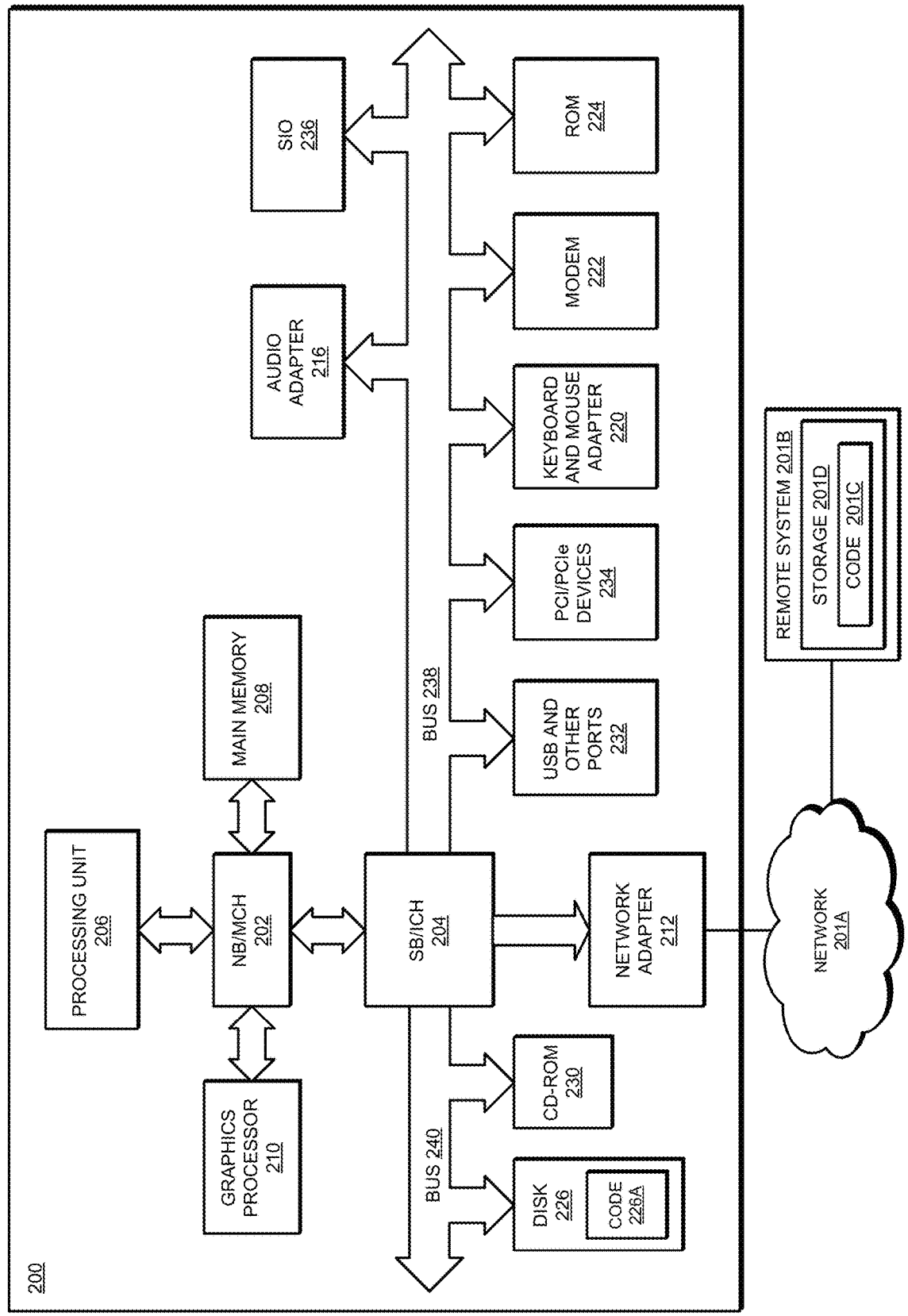
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Proxy server 104 and cognitive server 106 couple to network 102 along with storage unit 108. In one or more embodiments, storage 108 may be configured to store training data 109 for training one or more cognitive models associated with one or more of proxy server 104 and cognitive server 106. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, proxy server 104, cognitive server 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Proxy application 105 of proxy server 104 implements an embodiment of a proxy function configured to perform one or more functions of proxy server 104 as described herein including, but not limited to, receiving input signals from one or more sensor devices, computing handle functions on the input signals to determine handle values, and receiving answer values from cognitive server 106. Cognitive application 107 of cognitive server 106 is configured to perform one or more functions of cognitive server 106 within data processing system 100 as described herein including, but not limited to, receiving input signals from proxy server 104, computing an answer function and a handle function upon the input signals, and sending answer values and handle values to proxy server 104.

Cache 130 is an example of a storage cache described herein. Cache 130 is associated with proxy server 104 and configured to store one or more of answer values and handle values received from proxy server 104. In particular embodiments, cache 130 is a local cache to proxy server 104.

Sensor device 132 is an example of a sensor device described herein. For example, sensor device 132 may generate a measurement within the environment of sensor device 132 and send a signal, such as an audio or video signal, representative of the measurement to proxy server 104.

Proxy servers 104, cognitive server 106, storage unit 108, clients 110, 112, and 114, cache 130, and sensor device 132 may couple to network 102 using wired connections, wireless communication protocols, or other suitable data connectivity. Clients 110, 112, and 114 may be, for example, personal computers or network computers.

In the depicted example, cognitive server 106 may provide data, such as boot files, operating system images, and applications to clients 110, 112, and 114. Clients 110, 112, and 114 may be clients to cognitive server 106 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as applications 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. In another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
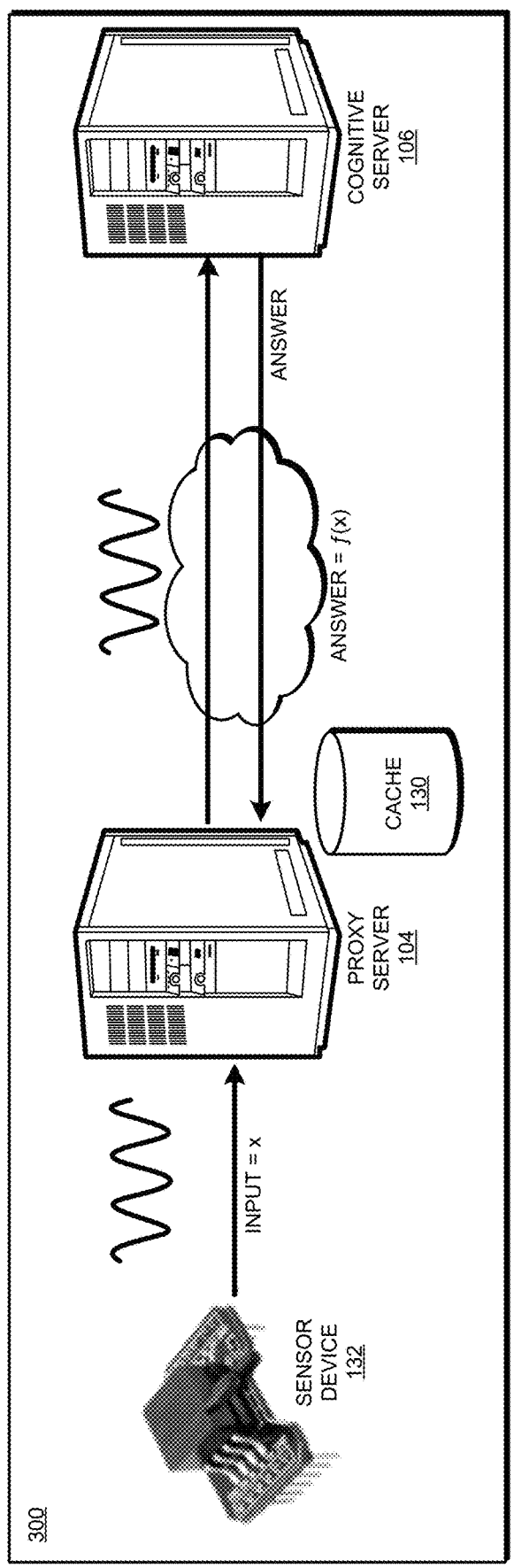
FIG. 3 depicts a block diagram of a communication network in which illustrative embodiments may be implemented.

With respect to FIG. 3, FIG. 3 depicts a block diagram of a communication network 300 in which illustrative embodiments may be implemented. The communication network 300 includes sensor device 132 in communication with proxy server 104 having associated local cache 130. Proxy server 104 is in further communication with cognitive server 106.

In one or more embodiments, proxy server 104 receives an input signal x from sensor device 132, and proxy server forwards the input signal x to cognitive server 106. In response to receiving the input signal x, cognitive server 106 computes an answer value from the input signal x using an answer function f(x). In particular embodiments, the answer function f(x) processes the input signal x using a cognitive processing model to generate a resulting answer value. In one or more embodiments, the cognitive processing model operates to transform a representation of the input signal using an answer function to compute an answer value. In particular embodiments, the cognitive processing model may include a neural network trained using training data (such as training data 109 of FIG. 1), a decision tree, a rule engine, a classification algorithm or any other cognitive processing technique. In particular embodiments, the answer value may include, for example, a classification or identification of the input signal x, an indication of further processing of the input signal x, or an indication of an action to be performed by cognitive server 106 or another computer or data processing system in response to receiving the input signal x. In a particular embodiment, the action includes sending a notification of the input signal x to a client device.

In one or more embodiments, cognitive server 106 is further configured to compute a handle value for the input signal x using a handle function g(x). In one or more embodiments, the handle function g(x) may include any function that may be used to compute a handle for a given input signal x based on the nature or property of the input signal x. In particular embodiments, the handle function g(x) may include one or more of a shallow neural network trained on the signal, an auto-encoder that extracts one or more features from the input signal, or a hash function.

In an embodiment, cognitive server 106 is further configured to send the answer value and the handle value to proxy server 104, and proxy server 104 is configured to store the answer value in association with the handle value within cache 130. In one or more embodiments, the handle function g(x) is also known to proxy server 104 as well as cognitive server 106. When proxy server 104 receives a new input signal y from sensor device 132, proxy server 104 computes the handle function g(y) on the input signal y to obtain a new handle value for the input signal y. Proxy server 104 compares the resulting handle value to previously stored handle function values within cache 130, for example the handle value resulting from g(x), to determine if the new handle value matches a stored handle value according to predetermined matching criteria. If the new handle value obtained from g(y) matches a stored handle value obtained from g(x) previously received from the server, the previously stored answer value of the answer f(x) is used as the answer value to the input signal y.

In one embodiment, the handle function g(x) is predetermined at proxy server 104, and proxy server 104 applies the handle function g(x) to input signal x to determine a handle value. Proxy server 104 sends the original input signal x to cognitive server 106. In an embodiment, cognitive server 106 is further configured to compute an answer value using answer function f(x) and send the answer value to proxy server 104. Proxy server 104 is configured to store the answer value in association with the handle value within cache 130. Proxy server 104 uses the handle value to check for the presence of a locally cached handle value and an associated answer value within cache 130, and uses the cached answer value as the answer value to a input signal having a handle value matching the associated cached handle value. An advantage to such an embodiment is that it may be implemented without making changes to an existing cognitive server.

In another embodiment, the handle function g(x) is predetermined at proxy server 104, and proxy server 104 applies the handle function g(x) to an input signal x to determine a handle value. Proxy server 104 uses the handle value to check for the presence of a locally cached handle value and an associated answer value, and uses the cached answer value as the answer value to a input signal having a handle value matching the associated cached handle value. Proxy server 104 further sends the computed handle value to cognitive server 106 using a communication protocol between proxy server 104 and cognitive server 106, and cognitive server 106 performs cognitive processing, such as classification of the input signal, using the handle value computed by proxy server 104 rather than the input signal x. An advantage of such an embodiment is that it avoids computation of the handle function g(x) at both proxy server 104 and cognitive server 106 saving computational resources within communication network 300.

In another embodiment, sensor device 132 is associated with a particular domain such as a particular location or environment in which sensor device 132 is allocated. Proxy server 104 associates a domain name with the domain of sensor device 132. In a particular embodiment, proxy server 104 sends the domain name to cognitive server 106 indicating that proxy server 104 serves the domain associated with the domain name. In response to receiving the domain name, cognitive server 106 determines the handle function g(x) that is optimal for serving the identified domain and sends a definition and/or indication of the handle function g(x) to proxy server 104. In an embodiment, cognitive server 106 determines a best handle function g(x) for the domain that can be performed based upon available training data. In a particular embodiment, hand function g(x) may include a trained neural network that is smaller or less complex than a neural network implemented by cognitive server 106 for the function f(x). In other particular embodiments, the determined handle function g(x) may include a feature extractor or signal encoder.

Upon receiving the definition or identification of the handle function g(x), proxy server 104 will utilize the handle function g(x) upon input signals received from sensor device 132. Upon receiving an input signal x from sensor device 132, proxy server 104 applies the handle function g(x) associated with the domain to the input signal x to determine a handle value. Proxy server 104 uses the handle value to check for the presence of a locally cached handle value and an associated answer value, and uses the cached answer value as the answer value to a input signal having a handle value matching the associated cached handle value. Proxy server 104 further sends the computed handle value to cognitive server 106 using a communication protocol between proxy server 104 and cognitive server 106, and cognitive server 106 performs cognitive processing, such as classification of the input signal, using the handle value computed by proxy server 104 rather than the input signal x. Cognitive server 106 is further configured to compute an answer value using answer function f(x) and send the answer value to proxy server 104. Proxy server 104 is configured to store the answer value in association with the handle value within cache 130. Proxy server 104 uses the handle value to check for the presence of a locally cached handle value and an associated answer value within cache 130, and uses the cached answer value as the answer value to a input signal having a handle value matching the associated cached handle value. An advantage of such an embodiment is that the handle function g(x) used to compute the handle value corresponding to an input signal x may be chosen by cognitive server 106 to be optimized according to a particular domain associated with sensor device 132.

In another embodiment, proxy server 104 receives the original input signal x from sensor device 132 and sends the original input signal x to cognitive server 106. Cognitive server 106 computes the handle function g(x) on the inputs signal x to determine a handle value, and sends the handle value to proxy server 104. Proxy server 105 determines whether the handle value is stored locally within cache 130. If the handle value is stored locally, proxy server 104 uses the answer value associated with the handle value. If the handle value is not stored locally, proxy server 104 sends a request to cognitive server 106 to for the answer value associated with the handle value. Cognitive server 106 is further configured to compute an answer value using answer function f(x) and send the answer value to proxy server 104. Proxy server 104 receives the answer value and stores the answer value and handle value within cache 130. Although such an embodiment requires additional messaging between proxy server 104 and cognitive server 106 when the handle value is not currently stored in cache 130, processing at proxy server 104 is significantly reduced.

In one embodiment, proxy server 104 and sensor device 132 may belong to and be operated by an organization that is different from the organization that is operating the cognitive server 106. As an example, proxy server 104 may be operated by a manufacturing plant that manufactures products and cognitive server 106 may be a cloud service operated by a cloud server provider. The sensor device 132 may be a camera. In the particular embodiment, the manufacturing plant provides the cloud service with training data that consists of several images that show what an acceptable product looks like and what typical defects in the products look like. In the embodiment, the cloud service uses the images to build a model, such as a neural network, for identifying good products and bad products. In the embodiment, the manufacturing plant uses the camera as sensor device 132 to send images of units produced during the manufacturing process to proxy server 104 which identifies good products and bad products, leveraging the model from cognitive server 106 in the cloud. In the particular embodiment, only one request for each type of defect or good product goes to the cloud service, enabling the manufacturing plant to keep its sensitive operational data, such as the total number of units produced and defect rates in its manufacturing process, private by not exposing the operational data to the cloud service. At the same time, the capabilities of the cloud service are used for training the model.

In another embodiment, the manufacturing plant may be using a microphone as sensor device 132, and using sounds produced by a unit during testing process to determine if a product is good or defective, such as checking for proper operation of a jet engine, a washing machine, a dryer, or an air-conditioner. In the embodiment, sounds of good and bad units are provided to the cloud service implementing the cognitive server 106 to train its models based on decision trees. In the embodiment, the sounds are checked by proxy server 106 without exposing sensitive information to the cloud service. Sensitive information, which may include operational data such as the total number of units produced and defect rates in its manufacturing process, are kept private, by not exposing the sensitive information to the cloud service.

In another embodiment, a bank may use a cognitive server 106 in the cloud provided by another cloud service operator to classify its loan documents into several levels of risk worthiness. Typical examples of different documents in different categories are provided to the cloud service which produces a neural network model to classify different documents into their corresponding risk categories. In the embodiment, the training process also trains a shallow model to define a handle function to characterize each document. In the embodiment, the bank uses the database server with loan documents as sensor device 132, and proxy service 106 to classify documents within the bank's control. In the embodiment, the bank avoids sending several documents to the cloud based service for classification.

Figure 4A:
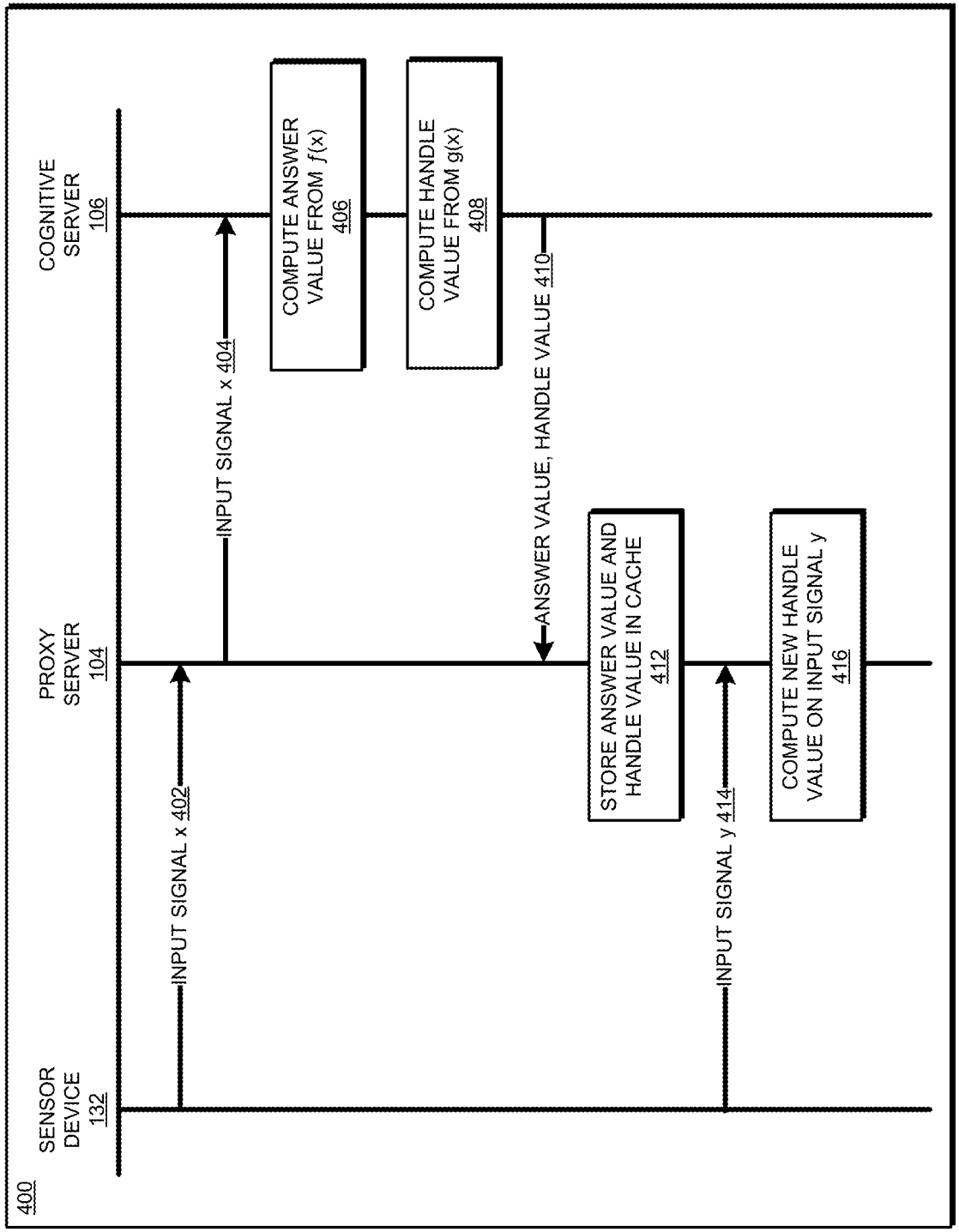

With reference to FIGS. 4A-4B, these figures depict an example messaging flow 400 between proxy server 104 and cognitive server 106 according to an illustrative embodiment. In 402, sensor device 132 sends a first input signal x to proxy server 104. In 404, proxy server 104 sends the first input signal x to cognitive server 106. In response to receiving the input signal x, in 406 cognitive server 106 computes a first answer value from answer function f(x). In particular embodiments, the answer function f(x) processes the first input signal x using a cognitive processing model to generate a resulting answer value. In 408, cognitive server 106 computes a first handle value corresponding to the first input signal x using a handle function g(x). In 410, cognitive server 106 sends the first answer value and first handle value to proxy server 104. In 412, proxy server 104 stores the first answer value in association with the first handle value within cache 130.

In 414, proxy server 104 receives a second input signal y from sensor device 132. In 416, proxy server 104 computes a new handle value on the input signal y using the handle function g(x). In 418, proxy server 104 compares the new handle value to the stored first handle value within cache 130. In one or more embodiments, cache 130 may include a plurality of answer values and associated handle values obtained from previously received input signals. In 420, if a match is found, proxy server uses the stored first answer value corresponding to the matching stored handle value as the answer for the input signal y. In 422, proxy server 104 sends the new input signal y to cognitive server 422 and the messaging flow 400 ends.

Figure 5:
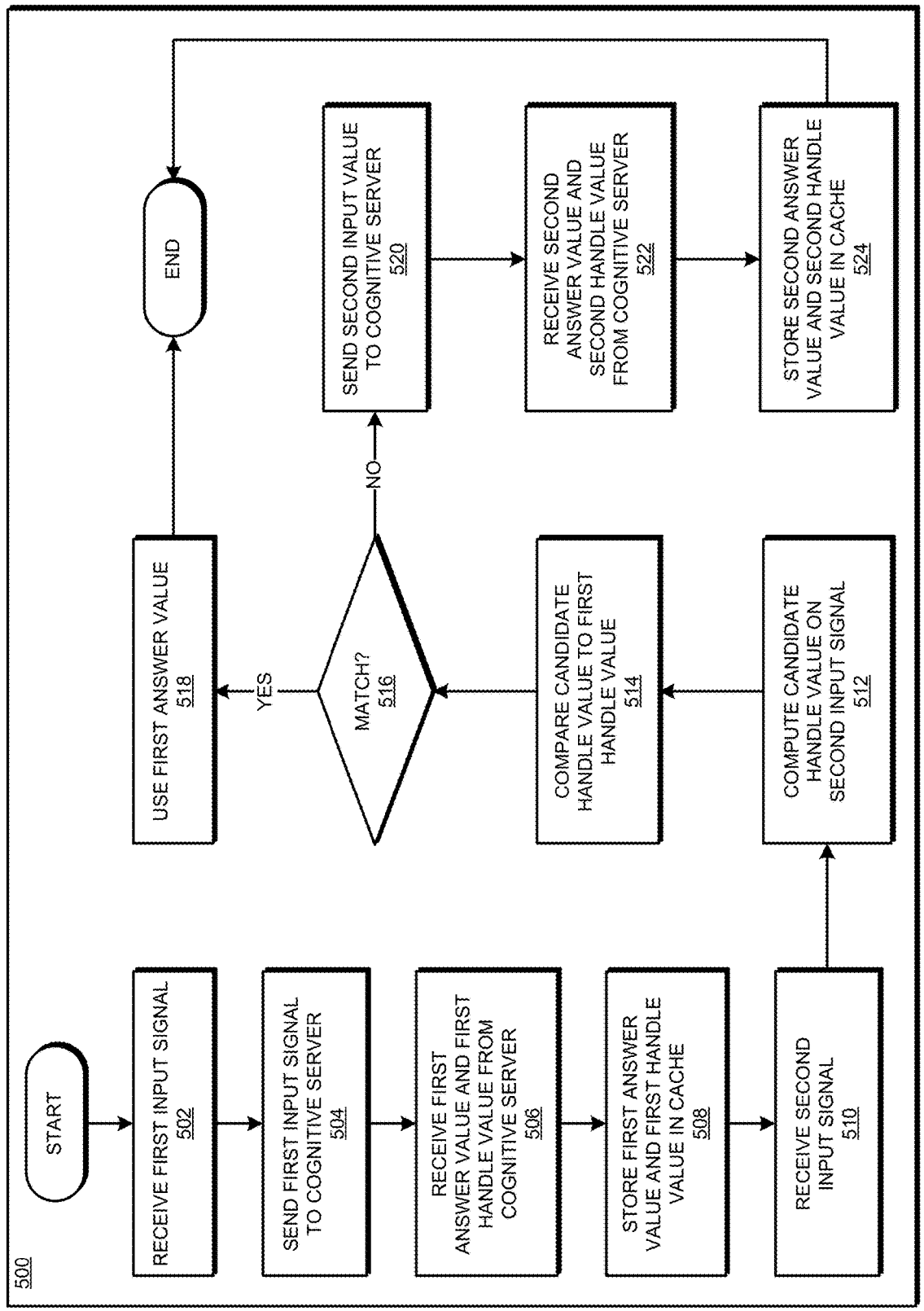
FIG. 5 depicts a flowchart of an example process associated with the proxy server according to an illustrative embodiment.

With reference to FIG. 5, this figure depicts a flowchart of an example process 500 associated with proxy server 104 according to an illustrative embodiment. In block 502, proxy server 104 receives a first input signal x from sensor device 132. In block 504, proxy server 104 sends the first input signal x to cognitive server 106. In response to receiving the input signal x, cognitive server 106 computes a first answer value from answer function f(x). Cognitive server 106 further computes a first handle value corresponding to the first input signal x using a handle function g(x). In block 506, proxy server 104 receives the first answer value and first handle value from cognitive server 106. In block 508, proxy server 104 stores the first answer value in association with the first handle value within cache 130.

In block 510, proxy server 104 receives a second input signal y from sensor device 132. In block 512, proxy server 104 computes a candidate handle value on the second input signal y using the handle function g(x). In block 514, proxy server 104 compares the candidate handle value to the stored first handle value within cache 130. In block 516, proxy server 104 determines if a match is found using predetermined matching criteria. In a particular embodiment, proxy server 104 determines that the candidate handle value matches the first handle value if a difference between the candidate handle value and the first handle value is within a predetermined threshold. If a match is found, in block 518 proxy server 104 uses the first answer value as the answer to the second input signal y and process 500 ends.

If no match is found between the candidate handle value and the first handle value, in block 520 proxy server 104 sends the second input value y to cognitive server 106. In response to receiving the second input value y, cognitive server 106 computes a second answer value from the answer function and a second handle value from the handle function, and sends the second answer value and second handle value to proxy server 104. In block 514, proxy server 104 stores the second answer value in association with the second handle value within cache 130. The process 500 then ends.

Although various embodiments are described with respect to performing caching operations between a proxy server and a cognitive server, it should be understood that the principles described herein may be applied to any suitable cognitive application performed by a computer system or other electronic device.

Thus, a computer implemented method, system or apparatus, and computer program product are provided in the illustrative embodiments for operations with caching of answer values of cognitive applications and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for caching of cognitive applications in a communication network comprising:

detecting, by a proxy having a cache associated therewith, a first input signal from a sensor device;

computing a representation of the first input signal, the representation being sent to a server;

applying a handle function to the representation of the first input signal to compute a first handle value corresponding to the first input signal, the first handle value comprising a unique representation of the first signal;

transforming the representation of the first input signal using a cognitive processing model of an answer function to compute a first answer value;

modifying, by the proxy, a content of the cache by storing the first answer value in association with the first handle value in the cache;

detecting, by the proxy, a second input signal;

computing, by the proxy, a candidate handle value using the handle function upon the second input signal, the candidate handle value comprising a unique representation of the second signal;

comparing the candidate handle value to the first handle value stored in the cache;

determining whether the candidate handle value matches the first handle value;

using, by the proxy, the first answer value for the second input signal responsive to determining that the candidate handle value matches the first handle value;

sending a representation of the second input signal to the cognitive server responsive to determining that the candidate handle value does not match the first handle value;

receiving a second handle value for the second input signal, the second handle value computed by applying the handle function to the representation of the second input signal;

receiving a second answer value corresponding to the representation of the second input signal, the second answer value being determined by transforming the representation of the second input signal using the cognitive processing model of the answer function to compute the first value; and modifying, by the proxy, the contents of the cache by storing, the second answer value in association with the second handle value in the cache.

2. The method of claim 1, wherein determining whether the candidate handle value matches the first handle value includes performing a nearest neighbor search between the candidate handle value and the first handle value.

3. The method of claim 1, wherein the first input signal is representative of a measurement by the sensor device within an environment of the sensor device.

4. The method of claim 1, wherein the handle function is configured to produce the handle value as a lower dimensional representation of the input signal than a dimension of the original input signal.

5. The method of claim 1, wherein the representation of the first input signal includes the first handle value determined at the proxy.

6. The method of claim 1, further comprising:
receiving, by the proxy, an indication of the handle function from the server.

7. The method of claim 6, further comprising:
sending a domain name associated with a domain of the sensor device to the server, the server determining the handle function from a plurality of handle functions based upon the domain name.

8. The method of claim 1, further comprising:
determining a reconstruction error on the first input signals using the handle function;
comparing a distribution of the reconstruction error of the first input signal to a distribution of reconstructions errors in training data associated with the cognitive model; and
triggering a cache invalidation operation upon the cache responsive to determining that the comparison of the distribution of reconstruction errors exceeds a predetermined threshold value.

9. The method of claim 1, wherein the method is embodied in a computer program product comprising one or more computer-readable storage mediums and computer-readable program instructions which are stored on the one or more computer-readable storage mediums and executed by one or more processors.

10. The method of claim 1, wherein the method is embodied in a computer system comprising one or more processors, one or more computer-readable memories, one or more computer-readable storage mediums and program instructions which are stored on the one or more computer-readable storage mediums for execution by the one or more processors via the one or more memories and executed by the one or more processors.

11. A computer program product for caching of cognitive applications in a communication network, the computer program product comprising one or more computer-readable storage media and program instructions stored on at least one of the one or more storage media, the stored program instructions comprising:
   program instructions to detect, by a proxy having a cache associated therewith, a first input signal from a sensor device;
   program instructions to compute a representation of the first input signal, the representation being sent to a server;
   program instructions to apply a handle function to the representation of the first input signal to compute a first handle value corresponding to the first input signal, the first handle value comprising a unique representation of the first signal;
   program instructions to transform the representation of the first input signal using a cognitive processing model of an answer function to compute a first answer value;
   program instructions to modify, by the proxy, a content of the cache by storing the first answer value in association with the first handle value in the cache;
   program instructions to detect, by the proxy, a second input signal;
   program instructions to compute, by the proxy, a candidate handle value using the handle function upon the second input signal, the candidate handle value comprising a unique representation of the second signal;
   program instructions to compare the candidate handle value to the first handle value stored in the cache;
   program instructions to determine whether the candidate handle value matches the first handle value;
   program instructions to use, by the proxy, the first answer value for the second input signal responsive to determining that the candidate handle value matches the first handle value;
   program instructions to send a representation of the second input signal to the cognitive server responsive to determining that the candidate handle value does not match the first handle value;
   program instructions to receive a second handle value for the second input signal, the second handle value computed by applying the handle function to the representation of the second input signal;
   program instructions to receive a second answer value corresponding to the representation of the second input signal, the second answer value being determined by transforming the representation of the second input signal using the cognitive processing model of the answer function to compute the first value; and
   program instructions to modify, by the proxy, the contents of the cache by storing, the second answer value in association with the second handle value in the cache.

12. The computer program product of claim 11, wherein the first input signal is representative of a measurement by the sensor device within an environment of the sensor device.

13. The computer program product of claim 11, wherein the handle function is configured to produce the handle value as a lower dimensional representation of the input signal than a dimension of the original input signal.

14. The computer program product of claim 11, wherein the representation of the first input signal includes the first handle value determined at the proxy.

15. The computer program product of claim 11, wherein the stored program instructions further comprise:

program instructions to receive, by the proxy, an indication of the handle function from the server.

16. The computer program product of claim 15, wherein the stored program instructions further comprise:
   program instructions to send a domain name associated with a domain of the sensor device to the server, the server determining the handle function from a plurality of handle functions based upon the domain name.

17. The computer program product of claim 11, wherein the stored program instructions further comprise:
   program instructions to determine a reconstruction error on the first input signals using the handle function;
   program instructions to compare a distribution of the reconstruction error of the first input signal to a distribution of reconstructions errors in training data associated with the cognitive model; and
   program instructions to trigger a cache invalidation operation upon the cache responsive to determining that the comparison of the distribution of reconstruction errors exceeds a predetermined threshold value.

18. A computer system for caching of cognitive applications in a communication network, the computer system comprising one or more processors, one or more computer-readable memories, and one or more computer-readable storage media, and program instructions stored on at least one of the one or more storage media for execution by at least one of the one or more processors via at least one of the one or more memories, the stored program instructions comprising:
   program instructions to detect, by a proxy having a cache associated therewith, a first input signal from a sensor device;
   program instructions to compute a representation of the first input signal, the representation being sent to a server;
   program instructions to apply a handle function to the representation of the first input signal to compute a first handle value corresponding to the first input signal, the first handle value comprising a unique representation of the first signal;
   program instructions to transform the representation of the first input signal using a cognitive processing model of an answer function to compute a first answer value;
   program instructions to modify, by the proxy, a content of the cache by storing the first answer value in association with the first handle value in the cache;
   program instructions to detect, by the proxy, a second input signal;
   program instructions to compute, by the proxy, a candidate handle value using the handle function upon the second input signal, the candidate handle value comprising a unique representation of the second signal;
   program instructions to compare the candidate handle value to the first handle value stored in the cache;
   program instructions to determine whether the candidate handle value matches the first handle value; and
   program instructions to use, by the proxy, the first answer value for the second input signal responsive to determining that the candidate handle value matches the first handle value;
   program instructions to send a representation of the second input signal to the cognitive server responsive to determining that the candidate handle value does not match the first handle value;
   program instructions to receive a second handle value for the second input signal, the second handle value computed by applying the handle function to the representation of the second input signal;

program instructions to receive a second answer value corresponding to the representation of the second input signal, the second answer value being determined by transforming the representation of the second input signal using the cognitive processing model of the answer function to compute the first value; and program instructions to modify, by the proxy, the contents of the cache by storing, the second answer value in association with the second handle value in the cache.

* * * * *